US011913605B2

(12) United States Patent
Mair et al.

(10) Patent No.: US 11,913,605 B2
(45) Date of Patent: Feb. 27, 2024

(54) FILLING GAS STORAGE TANKS (71) Applicant: Bundesrepublik Deutschland, vertreten durch die Bundesministerin für Wirtschaft und Energie, Berlin (DE)

(72) Inventors: Georg W. Mair, Großbeeren (DE); André Schoppa, Schönefeld (DE); Mariusz Szczepaniak, Berlin (DE)

(73) Assignee: BUNDESREPUBLIK DEUTSCHLAND, VERTRETEN DURCH DIE BUNDESMINISTERIN FÜR WIRTSCHAFT UND ENERGIE, Berlin (DE)

( * ) Notice: Subject to any disclaimer, the term of this patent is extended or adjusted under 35 U.S.C. 154(b) by 826 days.

(21) Appl. No.: 16/970,107

(22) PCT Filed: Feb. 5, 2019

(86) PCT No.: PCT/EP2019/052747
§ 371 (c)(1),
(2) Date: Aug. 14, 2020

(87) PCT Pub. No.: WO2019/158395
PCT Pub. Date: Aug. 22, 2019

(65) Prior Publication Data
US 2021/0364132 A1 Nov. 25, 2021

(30) Foreign Application Priority Data
Feb. 16, 2018 (DE) .................... 20 2018 100 884.6

(51) Int. Cl.
*F17C 13/08* (2006.01)
(52) U.S. Cl.
CPC .... *F17C 13/084* (2013.01); *F17C 2201/0109* (2013.01); *F17C 2201/035* (2013.01);
(Continued)

(58) Field of Classification Search
CPC .............. F17C 13/084; F17C 2201/035; F17C 2201/0109; F17C 2201/056;
(Continued)

(56) References Cited

U.S. PATENT DOCUMENTS 2,552,783 A     5/1951   Harper
4,640,323 A *   2/1987   Norcia ...................... F17C 5/02
                                                          222/394

(Continued)

FOREIGN PATENT DOCUMENTS

AT        40 456 T      2/1989
DE        677850 C     10/1937
(Continued)

OTHER PUBLICATIONS

International search report for patent application No. PCT/EP2019/052747 dated May 17, 2019.
(Continued)

*Primary Examiner* — Minh Q Le
(74) *Attorney, Agent, or Firm* — Bachman & LaPointe, P.C.

(57) ABSTRACT

A device (100, 100', 200, 300) for filling gas storage tanks (10) comprises a frame (110, 210, 310) and/or a housing, a gas buffer storage tank (120, 220, 320) for a gas which is movably arranged with respect to the frame and/or with respect to the housing, a first valve (130, 230, 330, 331) comprising an inlet, connected to the gas buffer storage tank (120, 220, 320), and an outlet for the connection to a gas storage tank to be filled, and a weighing device (140, 240, 340), connected to the gas buffer storage tank (120, 220, 320), for weighing the gas buffer storage tank (120, 220, 320).

20 Claims, 3 Drawing Sheets

(52) U.S. Cl.
CPC .. *F17C 2201/056* (2013.01); *F17C 2201/058* (2013.01); *F17C 2205/0107* (2013.01); *F17C 2205/0111* (2013.01); *F17C 2205/0126* (2013.01); *F17C 2205/0153* (2013.01); *F17C 2205/0188* (2013.01); *F17C 2205/0314* (2013.01); *F17C 2205/0326* (2013.01); *F17C 2205/0332* (2013.01); *F17C 2221/012* (2013.01); *F17C 2221/033* (2013.01); *F17C 2265/063* (2013.01)

(58) Field of Classification Search
CPC ........ F17C 2201/058; F17C 2205/0107; F17C 2205/0111; F17C 2205/0126; F17C 2205/0153; F17C 2205/0188; F17C 2205/0314; F17C 2205/0326; F17C 2205/0332; F17C 2265/063; F17C 2221/012; F17C 2221/033
USPC ........................................................ 137/259
See application file for complete search history.

(56) References Cited

U.S. PATENT DOCUMENTS

| | | | |
|---|---|---|---|
| 5,096,006 | A | 3/1992 | Howard |
| 5,472,024 | A * | 12/1995 | Brugerolle ................ F17C 5/06 141/351 |
| 5,829,465 | A * | 11/1998 | Garretson ............. F16K 21/165 137/430 |
| 5,953,682 | A * | 9/1999 | McCarrick ........... G06Q 10/087 705/28 |
| 7,721,557 | B1 * | 5/2010 | Stearns ..................... F17C 7/02 62/48.2 |
| 2010/0213083 | A1 * | 8/2010 | Olander .................. F17C 11/00 222/6 |
| 2013/0337737 | A1 | 12/2013 | Devarney et al. |
| 2015/0308622 | A1 * | 10/2015 | Koonce .................... F17C 5/06 141/4 |
| 2016/0305611 | A1 | 10/2016 | Handa |
| 2017/0074458 | A1 * | 3/2017 | Handa ...................... F17C 5/06 |

FOREIGN PATENT DOCUMENTS

| | | |
|---|---|---|
| DE | 685491 C | 12/1939 |
| DE | 19623380 C1 | 2/1998 |
| DE | 102004028442 A1 | 12/2005 |
| DE | 102013214044 A1 | 1/2015 |
| DE | 102015218230 B3 | 11/2016 |
| JP | 08332467 A | 12/1996 |
| JP | 11346120 A | 12/1999 |
| JP | 2594613 Y | 12/2003 |
| JP | 2004037085 A | 2/2004 |
| JP | 2007154927 A | 6/2007 |
| JP | 2012070357 A | 4/2012 |
| JP | 103328876 A | 9/2013 |
| JP | 5428755 B2 | 2/2014 |
| KR | 10-1985-0001566 A | 10/1985 |
| WO | 2011112110 A2 | 9/2011 |
| WO | 2012071593 A2 | 5/2012 |

OTHER PUBLICATIONS

German search report for patent application No. 20 2018 100 884.6 dated Oct. 1, 2018.
Korean office action for patent application No. 10-2020-7026623 dated Dec. 6, 2021.
Japanese office action for patent application No. 2020-542949 dated Aug. 3, 2021.
Chinese office action for patent application No. 201980021515.0 dated Jul. 6, 2021.
Japanese office action for patent application No. 2020-542949 dated Jan. 5, 2022.
Korean office action for patent application No. 10-2019-7035305 dated Jun. 28, 2021.
Chinese office action for patent application No. 201980021515.0 dated Mar. 1, 2022.
Japan Decision to Grant dated Jul. 12, 2022 issued for corresponding Japanese Patent Application No. 2020-542949.

* cited by examiner

FILLING GAS STORAGE TANKS

BACKGROUND OF THE INVENTION

The present invention relates to a device for filling gas storage tanks, in particular to a device for filling pressure vessels, test specimens for fire safety testing, for example, and propellant gas storage tanks for compressed gases, such as compressed natural gas and compressed hydrogen, which typically have a geometric internal volume of at least 10 liters, or even at least 200 liters, and/or pressure resistance of at least 200 bar.

Until now, pressure vessels and propellant gas storage tanks have typically been filled in accordance with the pressure. Since the pressure in a closed space is directly dependent on the temperature, exact filling to the target pressure, which is frequently also referred to as the nominal working pressure (NWP), at a reference temperature of 15° C., for example, requires the temperature in the pressure vessel to be homogeneous and to be precisely known. However, since the temperature in the vessel is changed to varying degrees by filling, it is not possible without considerable effort within a period of a few minutes to hours to obtain the temperature distribution information necessary for exact filling.

During the filling process at gas stations, the inhomogeneous temperature at the tank also cannot be measured sufficiently reliably and/or be comprehensively reliably communicated with the gas station.

As a result, the widely common approach of filling by pressure within acceptable filling times is a relatively imprecise process. In particular during tests, such as fire tests in which the fill level directly influences the test result, this imprecise form of filling has a particularly negatively impact: Test results can then essentially not be reproduced. In many instances, it is also not traceable to what extent an observed variance stems from the test specimen properties, variations in the load (such as fire load) or only from the unintended differences in the fill level.

SUMMARY OF THE INVENTION

With respect to what was said above, the present invention proposes a device for filling gas storage tanks as disclosed herein.

According to one embodiment, a device for filling gas storage tanks comprises a frame and/or a housing, a gas buffer storage tank for a gas, the gas buffer storage tank being movably arranged with respect to the frame and/or with respect to the housing, a first valve comprising an inlet, connected to the gas buffer storage tank, and an outlet for the connection to a gas storage tank to be filled, and a weighing device connected to the gas buffer storage tank for weighing the gas buffer storage tank.

Hereafter, the device for filling gas storage tanks is also referred to as a filling device and as a compressed gas filling device. Notwithstanding the above, the device can also be used for checking or testing valves.

The filling device allows the gas storage tank to be filled from the previously filled gas buffer storage tank, which is based on weighing the movably mounted gas buffer storage tank. Since the temperature distribution in the system is essentially irrelevant for the filling volume of the gas storage tank to be filled in this type of filling approach, the aforementioned disadvantages of filling by pressure can be easily avoided.

In principle, this could also be achieved by weighing the gas storage tank to be filled. Sufficiently precise weighing of the gas storage tank to be filled, however, is often either not possible, for example, when fueling vehicles, or at least not practical. Frequently, external error sources such as wind and precipitation can, at the most, only be taken into consideration by employing a very complex procedure. In the case of changing test specimen sizes/gas storage tank sizes or weights, an appropriate apparatus would then additionally have to be optimized and adapted in detail in a complex process. Moreover, a filled gas storage tank should, in general, no longer be considered as a test specimen during safety tests, such as during a fire test, for safety reasons, which would then result in a loss of the expensive weighing unit during testing.

The gas buffer storage tank is typically arranged within the frame and/or the housing. This allows the weighing of the movably mounted gas buffer storage tank to be decoupled well from outside conditions, and the filling device can also be used outdoors, in particular in the vicinity and/or as part of a fire test site or another safety policy site.

Moreover, the filling device can comprise four or more wheels, stacking slots or transport and/or lifting eyes connected to the frame and/or the housing. In this way, the transport of the filling device can be facilitated.

In one exemplary embodiment, the gas buffer storage tank is rotatably mounted. The gas buffer storage tank is typically mounted rotatably about an at least substantially horizontally oriented first axis, that is, mounted rotatably about a first axis having an angular deviation from the horizontal of no more than 10°, or even no more than 3°.

For example, a typically at least substantially cylindrical gas buffer storage tank, for example a gas buffer storage tank that, apart from the end or connection regions, is cylindrical, can be mounted at a first end by way of a clamp bearing.

The clamp bearing can be translatorily fixed to the frame and/or the housing in all directions and allows a rotation about the first axis.

The clamp bearing, however, typically inhibits a rotational movement of the gas buffer storage tank about axes oriented perpendicularly to the first axis.

In this way, the (rotational) movement of the gas buffer storage tank during filling of the gas storage tank can be at least substantially limited to a rotational movement about the first axis. This facilitates reliable weighing of the gas buffer storage tank during filling of the gas storage tank.

As an alternative or in addition, an at least substantially vertically oriented guide can be provided, for limiting a translatory movement of a second end of the gas buffer storage tank, located opposite the first end, in a direction parallel to the first axis.

So as to prevent mechanical stresses from occurring due to the movement and a (pressure-dependent) change in length of the gas buffer storage tank, among other things, during filling of the gas storage tank, the second end, in this exemplary embodiment, is typically mounted movably in directions oriented perpendicularly to the first axis.

In particular, the second end can be connected to the frame and/or the housing by way of the weighing device, wherein the second end is held movably with respect to the weighing device or is held in the vertical by the weighing device.

The weighing device is typically fixedly connected to the frame and/or the housing.

Moreover, the weighing device can be arranged beneath or above the gas buffer storage tank.

The weighing device is typically connected to the gas buffer storage tank, in particular at the second end thereof, by way of a flexible holding mechanism or a flexible connecting element.

In this way, it can be achieved that the movement of the gas buffer storage tank, during filling of the gas storage tank, does not influence the measurement accuracy of the weighing device at all, or at least only insignificantly.

When the weighing device is arranged beneath the gas buffer storage tank, the flexible connecting element can be formed by a hydraulic damper or a spring, for example a steel spring, and/or comprise the hydraulic damper and/or the spring.

When the weighing device is arranged above the gas buffer storage tank, the flexible connecting element can comprise a cable, a chain and/or a flexible rod and/or be formed of a cable, a chain or a flexible rod.

The cable or the chain can comprise steel or even consist of steel.

The flexible rod can be formed by a CFRP (Carbon Fiber Reinforced Polymer) leaf spring, for example.

As an alternative or in addition, the weighing device can be connected to the gas buffer storage tank, and in particular the second end thereof, by way of at least one joint, for example one or two joints.

A rotational axis of the at least one joint is typically parallel to the first axis. Even more typically, the at least one joint has only one corresponding rotational axis.

The weighing device can comprise a load cell or even be formed by a load cell. For example, the load cell can comprise a strain gauge.

So as to enable sufficiently precise measurement of the fill volume, the weighing device, at a given temperature, depending on the type of gas and gas volume to be added, has a weight resolution corresponding to the pressure, which is equivalent to a resolution of the pressure in the gas storage tank of at least 2 bar or even at least 1 bar.

The conversion of the weight resolution into a resolution of the pressure p can be carried out, for example, based on a state equation of real gases, in particular using the thermal state equation of real gases, to which a real gas factor Z was added:

$$p*V=Z*R*T.$$

For example, the real gas factor for natural gas at a temperature T of 293.15 K (20° C.) is Z=0.813.

For a 50-liter gas storage tank filled with natural gas (having a molar mass of 16.043 g/mol) at a pressure of 200 bar, this results in a mass m of the added natural gas of 8.096 kg. Under these conditions, a pressure difference of 1 bar corresponds to approximately 40 g.

Accordingly, the weighing device typically has a relative weight resolution (resolution in kg/weighing range in kg) of at least 1% or 0.5%, even 0.4% (40 g/10 kg).

In this way, considerably more precise fillings can be achieved than with gas filling by pressure. When a 50-liter gas vessel controlled at 200 bar pressure is filled with natural gas, and this results in an assumed effective mean temperature increase to 50° C. (to 323.15° K, real gas factor Z=0.879), the gas vessel is only filled with approximately 6.7 kg, corresponding to a difference/error of approximately 16%!

This exemplary calculation demonstrates that, compared to filling the gas storage tank by pressure, a considerable increase in the accuracy of the fill volume (mass), or of the discharge volume, can be achieved by determining the gas mass in the gas buffer storage tank by way of weighing, in particular continuous weighing of the gas mass in the gas buffer storage tank during the filling process of a gas storage tank (for example of a test specimen, an installed motor vehicle tank or another gas vessel) or a discharge process (for example for testing valves).

In particular for high pressures, the desired weight resolution can typically be calculated more precisely by way of value tables for the p-T-m relationships for the gases or gas mixtures or associated interpolation functions. For example, the respective p-T-m relationships can be derived from the Reference Fluid Thermodynamic and Transport Properties Database (REFPROP) of the National Institute of Standards and Technology (NIST, Gaithersburg, Maryland, USA).

Depending on the gas storage tank to be filled, the weighing range of the weighing device can be at least 10 kg, or even 1000 kg.

An internal volume of the gas buffer storage tank, the capacity of which is typically gauged by liters of water, can be at least 10 L, at least 200 L, or even at least 500 L.

The inlet of the first valve can be fluidically connected to the gas buffer storage tank, and in particular to the first end thereof, typically by way of a flexible first fluidic connection or by way of at least one second valve, which can be connected to the gas buffer storage tank by way of the flexible first fluidic connection.

As a result of the use of a flexible first fluidic connection to the gas buffer storage tank, measuring influences on the weighing can be at least substantially precluded.

The flexible first fluidic connection can comprise a hose or a spiral tube or be formed by a hose or a spiral tube.

The first valve and/or the at least one second valve are typically controllable.

So as to enable at least substantially automatic filling of the gas storage tank, the filling device according to one refinement comprises a control unit, which is connected to the first valve, the at least one second valve and/or the weighing device and is configured to trigger an opening and/or a closing of the particular valve, to receive measured values from the weighing device, and/or to use the received measured values for opening and/or closing the valve or valves.

The control unit is typically configured to trigger the closing of the first valve when the measured values reach or drop below a predefinable threshold and/or reach or exceed a predefinable difference (difference in mass) in relation to an initial measured value prior to the first valve being opened.

Moreover, for safety reasons, a first temperature sensor can be arranged at the gas buffer storage tank, and/or the gas storage tank to be filled can be provided with a second temperature sensor.

The first temperature sensor and/or the second temperature sensor are typically connected to the control unit and/or a display unit. The display unit can be connected to the control unit.

The control unit is typically configured to only trigger the opening of the first valve for filling the gas storage tank to be filled when a measured temperature value transmitted by the first temperature sensor reaches or drops below a predefinable first threshold value.

The control unit can furthermore be configured to trigger the closing of the first valve when the measured temperature value transmitted by the first temperature sensor reaches or exceeds a predefinable second threshold value, and/or when a measured temperature value transmitted by the second temperature sensor reaches or exceeds a predefinable third threshold value.

In addition, for safety reasons, a first pressure sensor fluidically connected to the gas buffer storage tank and/or a second pressure sensor connectable to the gas storage tank to be filled or connected to a second fluidic connection, which is connected to the outlet of the first valve, can be provided.

The first pressure sensor and/or the second pressure sensor are typically connected to the control unit and/or the display unit.

The control unit can be configured to only trigger the opening of the first valve for filling the gas storage tank to be filled when a measured pressure value transmitted by the first pressure sensor reaches or exceeds a predefinable threshold value.

The control unit can furthermore be configured to trigger the closing of the first valve when a measured pressure value transmitted by the second pressure sensor reaches or exceeds a predefinable further threshold value.

The filling device, and in particular the gas buffer storage tank, respective valves, the flexible first fluidic connection and the second fluidic connection typically have a pressure resistance of at least 200 bar, at least 700 bar, at least 1000 bar or even at least 1200 bar.

Moreover, one or more further gas buffer storage tanks that are fluidically connected to the gas buffer storage tank and accordingly mounted can be provided, which are mechanically connected to the weighing device and/or the gas buffer storage tank.

At the same temperature, symmetrical line connection of the fluidically communicating, parallel-connected gas buffer storage tanks and not too high filling rates, it may also suffice to accordingly movably mount and weigh only one of the multiple gas buffer storage tanks during the filling of the gas storage tank. Then the other gas buffer storage tank(s) can be fixed.

Furthermore, a temperature control unit for setting and/or lowering a temperature of the gas buffer storage tank or of the gas buffer storage tanks, for example during or after the filling of the gas buffer storage tank or of the gas buffer storage tanks, may be provided. In this way, after the gas buffer storage tank has or the gas buffer storage tanks have been filled, the filling device can be used more quickly again for filling further gas storage tanks to be filled.

Moreover, a compressor and a third valve may be provided, wherein the compressor is typically connected to one or more compressed gas cylinders, and can be fluidically connected to the gas buffer storage tank by way of the third valve.

In addition, a purging unit for introducing purging gases into the gas buffer storage tank and/or an evacuation unit for evacuating the gas buffer storage tank, for example a vacuum pump, can be provided for cleaning the gas buffer storage tank.

The purging unit is typically fluidically connectable or, depending on the valve state/valve states, is fluidically connected to the gas buffer storage tank, and in particular to the first end thereof, by way of a fourth valve.

In addition, the evacuation unit is typically fluidically connectable or, depending on the valve state/valve states, is fluidically connected to the gas buffer storage tank, and in particular to the first end thereof, by way of a fifth valve.

The at least one second valve is typically arranged between the first valve and the gas buffer storage tank, between the third valve and the gas buffer storage tank and/or between the fourth valve and the gas buffer storage tank.

Moreover, the compressor, the purging unit, the evacuation unit, the third valve, the fourth valve and/or the fifth valve can be controllable and be connected to the control unit.

For safety reasons, the first valve, the at least one second valve, the third valve, the fourth valve and/or the fifth valve are moreover solenoid valves, compressed air-controlled, and/or closed when deenergized.

In the event of a loss of control (due to power failure, for example), the gas buffer storage tank can thus be closed in each direction, and a stable state can thereby be established for the gas buffer storage tank and the gas vessel to be filled.

If critical situations are detected by the control unit using pressure and/or temperature data (for example, danger of a fire load or an impact load of the gas buffer storage), the control unit can be configured to trigger a pressure relief/venting of the gas buffer storage tank, for example by way of an additional relief valve/relief nozzle.

The above-described embodiments can be arbitrarily combined with one another.

BRIEF DESCRIPTION OF THE DRAWINGS

Further advantageous embodiments, details, aspects and features of the present invention will be apparent from the dependent claims, the description and the accompanying drawings. In the drawings:

DETAILED DESCRIPTION

In the figures, identical reference numerals, or reference numerals in which the first digit agrees with a digit of a designation in the figures, accordingly denote identical parts or elements. For example, a part denoted in FIG. 2A by a reference numeral 230 may correspond to an identical or similar part in FIG. 1A bearing a reference numeral 130.

Figure 1A:
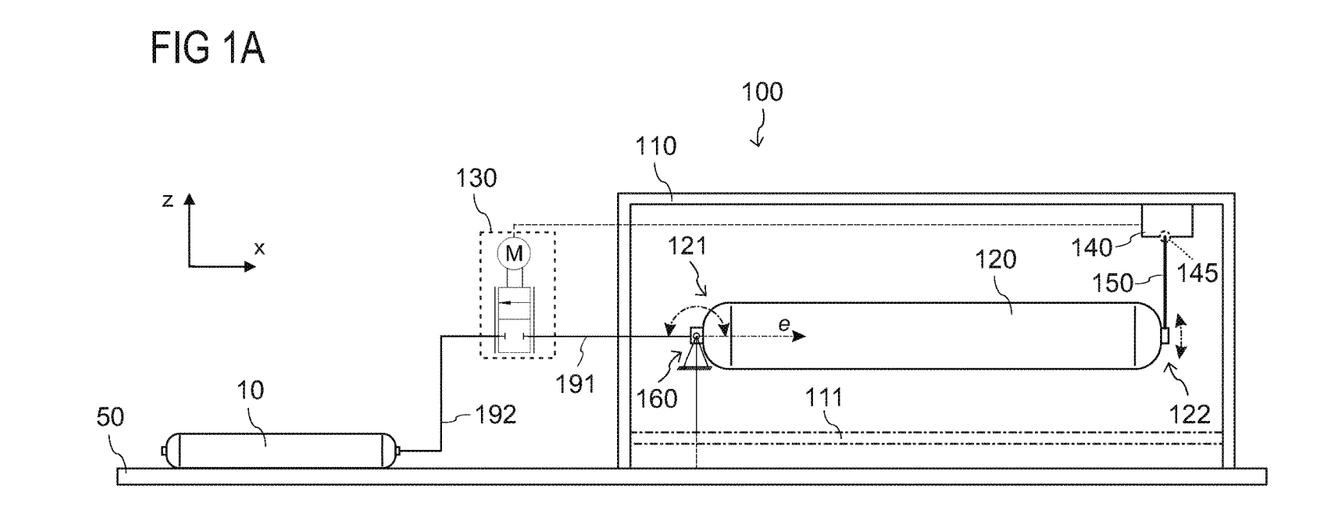
FIG. 1A shows a schematic side view of a device for filling gas storage tanks according to one exemplary embodiment.

FIG. 1A shows a schematic side view of a device 100 for filling gas storage tanks 10 using a gas buffer storage tank 120. The shown gas storage tank 10 to be filled can be a gas pressure vessel to be subjected to a safety test, for example.

In the exemplary embodiment, the gas buffer storage tank 120 is movably arranged within a frame or housing 110, which is situated on a ground 50.

For the sake of simplicity, the following description refers to the frame. However, it shall be understood that the frame can be at least partially encased or be replaced with a housing.

The substantially cylindrical exemplary gas buffer storage tank 120 is mounted at the (left) first end 121 thereof by way of a clamp bearing 160.

As is illustrated in FIG. 1A by the dotted vertical line beneath the clamp bearing, the clamp bearing 160 can rest on the ground 50.

In this figure and those that follow, a Cartesian coordinate system is shown in each case for improved orientation, wherein the z direction represents the vertical direction, and the x and y directions represent horizontal directions that are orthogonal with respect to one another.

The clamp bearing 160, however, is preferably attached to the frame 110, for example to a base plate or a cross brace 111.

The clamp bearing 160 is typically designed in such a way that the gas buffer storage tank 120 is movable about a first axis oriented in the y direction. For example, the clamp bearing 160 can be designed in such a way that a longitudinal axis "e" of the gas buffer storage tank 120 is movable about the first axis by at least by several degrees or even several 10°. However, these values may depend on the shape and, in particular, on the length of the gas buffer storage tank (distance between the ends 121, 122).

In addition, the clamp bearing 160 can be designed in such a way that a movement of the gas buffer storage tank 120 about further axes is inhibited.

At a second end 122 located opposite the first end 121, the gas buffer storage tank 120 is connected by way of a flexible connecting element 150 to a weighing device 140, which is fixedly arranged inside the frame 110 and above the second end 122.

As is illustrated in FIG. 1A by the dotted circle, the connecting element 150 can also be connected to the weighing device 140 by way of a joint 145.

In the exemplary embodiment, the first end 121 is fluidically connected, by way of a flexible first fluidic connection 191, to an inlet of a first valve 130, the outlet of which is connected to the gas storage tank 10 to be filled by way of a second fluidic connection 192.

The valve 130 can be fixedly connected to the frame 110.

Figure 1B:
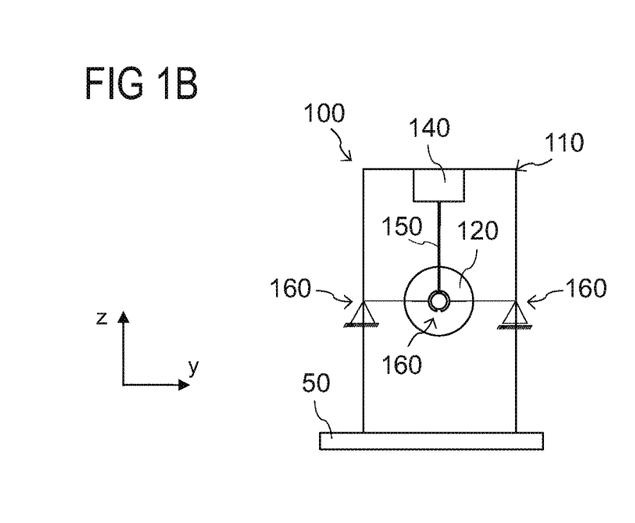
FIG. 1B shows a further schematic side view of the device shown in FIG. 1A for filling gas storage tanks according to one exemplary embodiment.
Figure 1C:
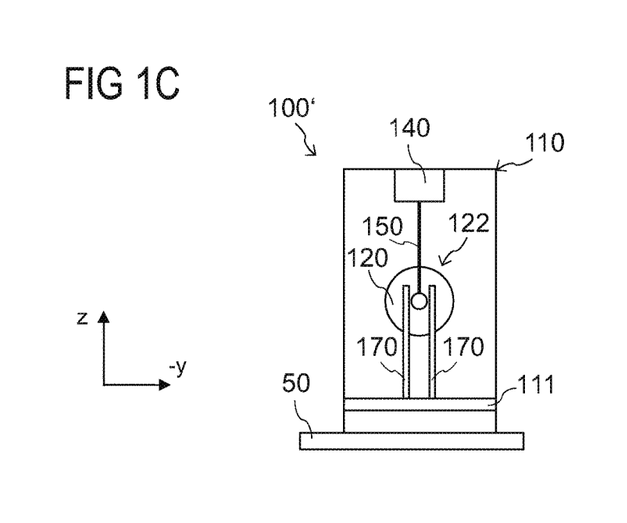
FIG. 1C shows a schematic side view of a device for filling gas storage tanks according to one exemplary embodiment.

In contrast to what is shown in FIG. 1C, the valve 130, however, can also be arranged inside the frame.

The valve 130 can be used to open and close a fluidic connection between the gas buffer storage tank 120 and the gas storage tank 10.

When the valve 130 is open, a gas stream can flow from the gas buffer storage tank 120 into the gas storage tank 10 for filling the gas storage tank 10.

The valve 130 can be closed again when a desired mass of the filling gas (desired gas filling volume) has flown out of the gas buffer storage tank 120, which can be ascertained with sufficient precision by way of the weighing device 140.

The second fluidic connection 192 can be flexible or rigid.

Moreover, a length of the second fluidic connection 192 can be relatively large, for example up to several meters or even up to several 10 m.

In particular in the case of larger line lengths of the second fluidic connection 192, for example exceeding several meters, the internal volume of the fluidic connections 191, 192 is typically taken into consideration in the determination of the desired mass of the filling gas.

FIG. 1B shows a schematic view of the device 100 which corresponds to a view of the device 100 in FIG. 1A from the left, the optional base plate 111 not being shown for the sake of clarity.

FIG. 1C shows a schematic view of a device 100' which is similar to the device 100 described above with reference to FIGS. 1A, 1B. FIG. 1A can even correspond to a corresponding schematic view of the device 100, FIG. 1C then corresponding to a view from the right.

As is shown in FIG. 1C, the second end 122 of the gas buffer storage tank 120 can additionally be guided in a vertically oriented guide 170, which can be connected to the base plate 50. In this way, a translatory movement of the second end 122 of the gas buffer storage tank 120 in a direction y, −y parallel to the first axis can be reliably limited.

As a result, the movement of the gas buffer storage tank 120 (or of the longitudinal axis e thereof) with respect to the frame or housing 110, or the ground 50, during filling of the gas storage tank 10 is at least substantially limited to a rotational movement about the first axis that is parallel to the y direction (see also the double-headed arrows in FIG. 1A).

Figure 2A:
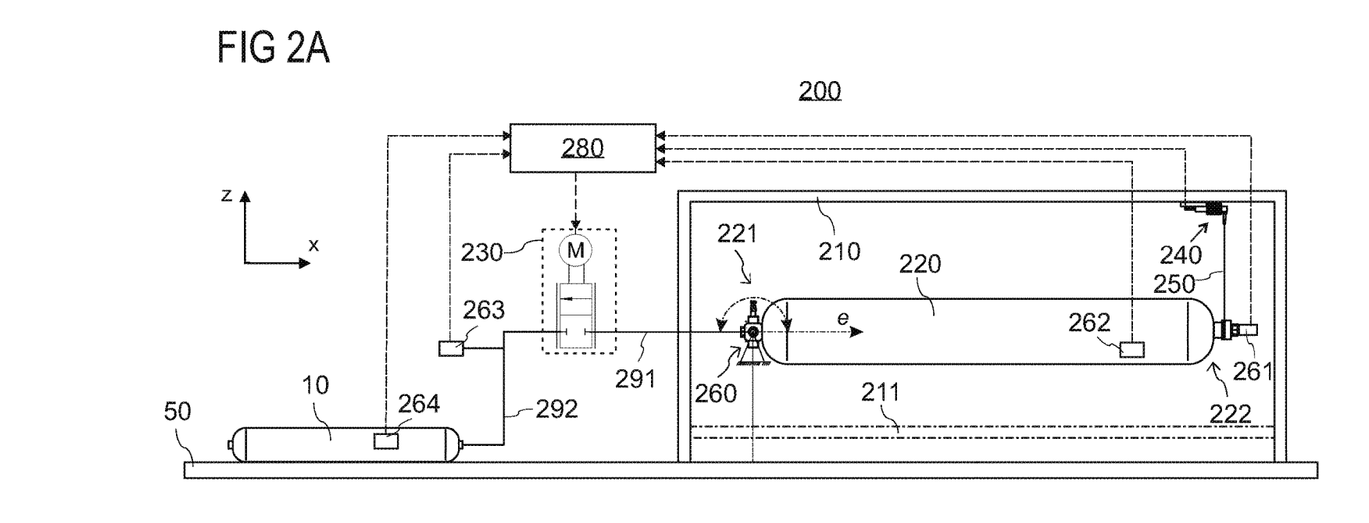
FIG. 2A shows a schematic side view of a device for filling gas storage tanks according to one exemplary embodiment.

FIG. 2A shows a schematic side view of a device 200 for filling gas storage tanks 10 by way of a gas buffer storage tank 220. The device 200 is typically similar to the devices 100, 100' described above with respect to FIGS. 1A to 1C.

However, the filling device 200 comprises a control unit 280, which is connected both to the first valve 230 and to the weighing device 240, which is shown in greater detail, to receive measured values from the weighing device 240 and, based thereon, to open or to close, or even to control, the first valve 230 (see the dotted arrows, which also indicate the direction of the flow of information).

For example, the first valve 230 can be closed by the control unit 280 when a predefined decrease in weight of the gas buffer storage tank 220 is reached according to the transmitted data of the weighing device 240.

In the exemplary embodiment, the control unit 280 is additionally connected to a first temperature sensor(s) 262 attached to and/or in the gas buffer storage tank 220, a second temperature sensor(s) 264 attached to and/or in the gas storage tank 10, a first pressure sensor 261 fluidically connected to the second end 222, and a second pressure sensor 263 fluidically connected to the second fluidic connection 292.

The respective data transmitted from the sensors 261 to 264 to the control unit 280 can, as described above, be used to control the filling process and/or to detect a hazardous situation. When such a hazardous situation has been detected, the control unit 280 can additionally introduce a safety measure, for example the closure of the first valve 230.

Figure 2B:
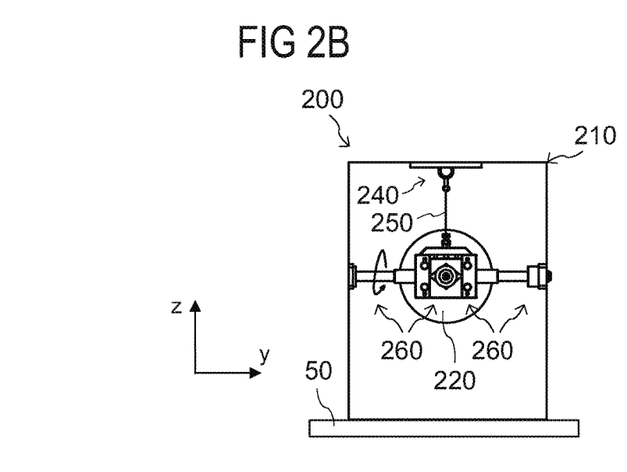
FIG. 2B shows a further schematic side view of the device shown in FIG. 2A for filling gas storage tanks according to one exemplary embodiment.

FIG. 2B shows a schematic view of the device 200, which corresponds to a view of the device 200 in FIG. 2A from the left. The clamp bearing 260 is illustrated in greater detail therein.

Figure 2C:
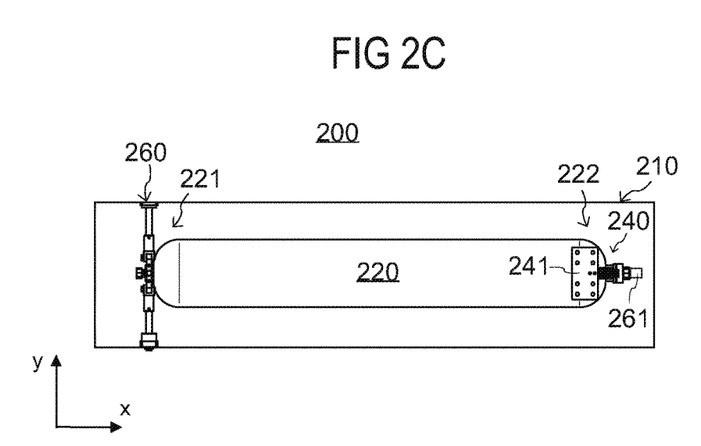
FIG. 2C shows a schematic top view of the device shown in FIG. 2A for filling gas storage tanks according to one exemplary embodiment.

FIG. 2C shows the device 200 in a schematic view from above, in which the clamp bearing 260 is likewise illustrated in greater detail. FIG. 2C furthermore shows an attachment plate 241, by which the weighing device 240 is attached to the frame 210.

Figure 3:
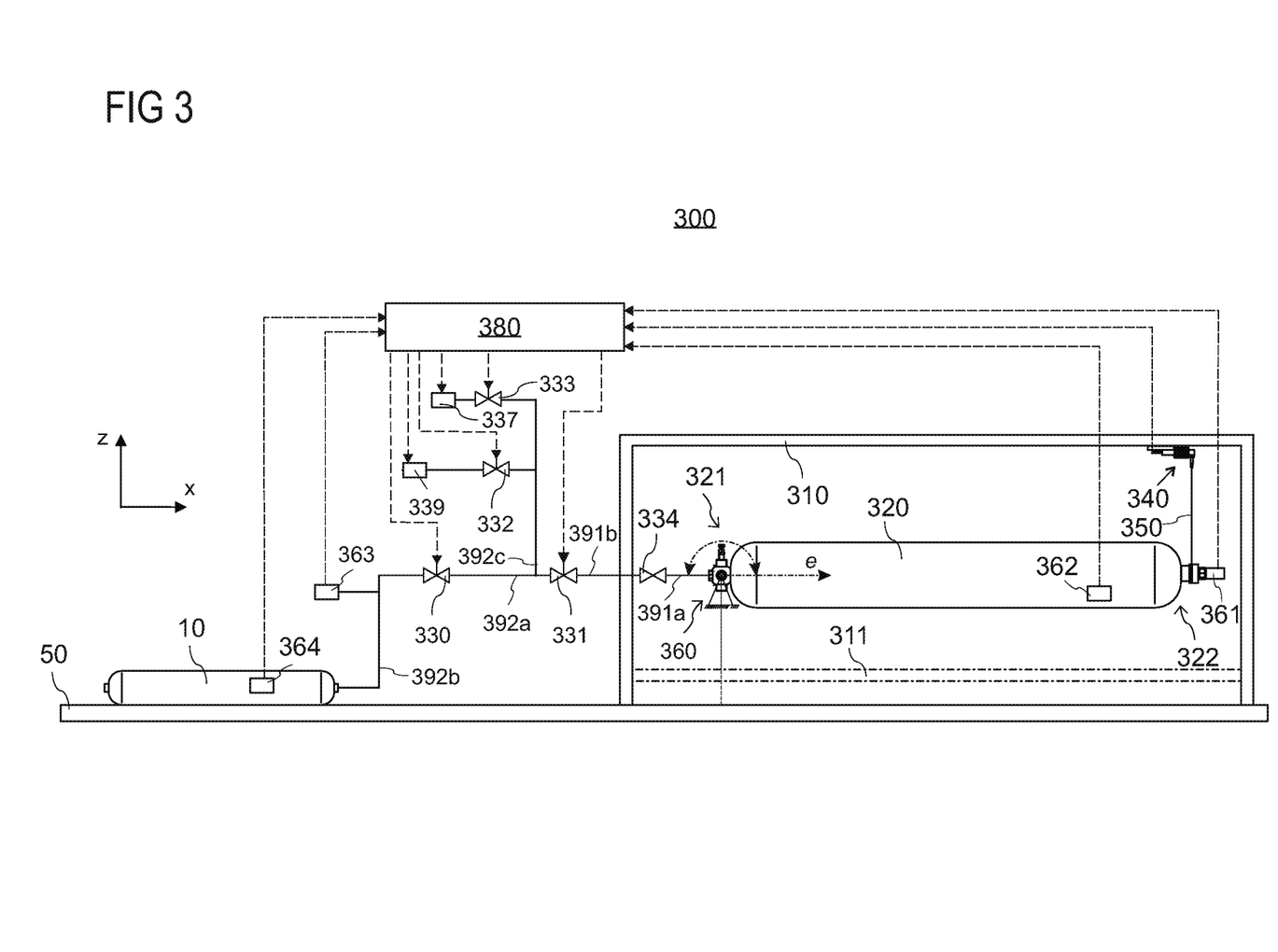
FIG. 3 shows a schematic side view of a device for filling gas storage tanks according to one exemplary embodiment.

FIG. 3 shows a schematic side view of a device 300 for filling gas storage tanks 10 using a gas buffer storage tank 320. The device 300 is typically similar to the device 200 described above with reference to FIGS. 2A to 2C.

The filling device 300 likewise comprises a control unit 380, which, however, is connected to further valves and can open, close and/or even control these.

Moreover, a typically manually operable shut-off valve 334 can be provided inside the frame 310, which is fluidically connected to the first end 321 of the gas buffer storage tank 320 by way of the flexible first fluidic connection 391a.

During the transport of the device 300, the shut-off valve 334 can ensure that the gas buffer storage tank 320 is closed for safety reasons.

As is shown in FIG. 3, a typically likewise controllable second valve 331, which is connected to the shut-off valve 334 by way of a fluidic connection 391b, can be provided between the first valve 330, which is connected to the gas storage tank by way of the second fluidic connection 392b, and the shut-off valve 334 or the first end 321.

This design makes it possible to easily integrate or control further useful components of the device 300.

Moreover, it shall be noted that the valve 331 can also be considered as the first valve, and the valve 330 can also be considered as the second valve.

In the exemplary embodiment, a further fluidic connection 392c branches off a fluidic connection 392a between the first valve 330 and the second valve 331.

In particular, a compressor 339 for filling the gas buffer storage tank 320 can be connected by way of the further fluidic connection 392c and an appropriate valve 332.

Furthermore, a gas purging device 337 for cleaning the gas buffer storage tank 320 can be connected by way of the further fluidic connection 392c and an appropriate valve 333.

Moreover, a vacuum pump, which is not shown and can likewise be used to clean the gas buffer storage tank 320, can be connected by way of the further fluidic connection 392c and a further valve, which is likewise not shown.

Finally, a drain valve, which is not shown and connected to the fluidic connection 391a, and/or a pressure control valve or a rupture disk can be connected between the shut-off valve 334 and the first end 321.

The devices described herein (compressed gas filling devices) enable a high weight resolution during the filling of the gas storage tank(s). This is in particular important for gas pressure vessels to be filled (compressed gas storage tanks), in particular when the gas pressure vessels to be filled are to be used during a safety test, for example for a fire safety test (in particular a fire resistance check) or for testing a valve. It should be noted that the empty mass of such containers is usually relatively high compared to the filling mass of the medium that can be stored in them (for example, compressed natural gas at a pressure of 200 bar).

According to one embodiment, the devices described herein (compressed gas filling devices) are used to fill a gas storage tank for a safety test, and in particular a gas pressure vessel for a safety test. The safety test can, for example, be a fire safety test during which the filled gas storage tank serves as the test specimen, but may also be a valve test.

The present invention was described based on exemplary embodiments. These exemplary embodiments are not to be understood to be limiting to the present invention in any way. The following claims represent a first, non-binding attempt to define the invention in general terms.

The invention claimed is:

1. A device for filling gas storage tanks, comprising:
a frame and/or a housing;
a gas buffer storage tank for a gas, the gas buffer storage tank being rotatably arranged with respect to the frame and/or with respect to the housing;
a first valve, comprising an inlet connected to the gas buffer storage tank, and an outlet for connection to a gas storage tank to be filled; and
a weighing device connected to the gas buffer storage tank for weighing the gas buffer storage tank, wherein the gas buffer storage tank is mounted to and/or is arranged within the frame and/or the housing, wherein the gas buffer storage tank is mounted rotatably about an at least substantially horizontally oriented first axis, and/or wherein the gas buffer storage tank is mounted in such a way that a movement of the gas buffer storage tank, during filling of the gas storage tank, is at least substantially limited to a rotational movement about the first axis.

2. The device according to claim 1, wherein the gas buffer storage tank is mounted at a first end via a clamp bearing inhibiting a rotational movement of the gas buffer storage tank about axes oriented perpendicularly to the first axis.

3. The device according to claim 2, wherein the clamp bearing is fixedly connected to the frame and/or the housing with respect to translatory motion in any direction, and/or allows a rotation about the first axis.

4. The device according to claim 1, wherein the gas buffer storage tank is at least substantially cylindrical, and/or wherein the gas buffer storage tank at a second end, located opposite the first end, is mounted movably in directions oriented perpendicularly to the first axis.

5. The device according to claim 4, comprising an at least substantially vertically oriented guide for limiting a translatory movement of the second end of the gas buffer storage tank in a direction parallel to the first axis.

6. The device according to claim 4, wherein the second end is connected to the frame and/or the housing via the weighing device, wherein the weighing device is fixedly connected to the frame and/or the housing, wherein the weighing device is connected to the gas buffer storage tank via at least one joint comprising a rotational axis which is parallel to the first axis, and/or wherein the second end is movable with respect to the weighing device.

7. The device according to claim 1, wherein the weighing device is connected to the gas buffer storage tank via a flexible connecting element.

8. The device according to claim 7, wherein the flexible connecting element is connected to the second end of the gas buffer storage tank, wherein the flexible connecting element comprises a cable, a flexible rod and/or a chain, and/or is formed by a cable, a flexible rod or a chain, the cable or the chain comprising steel and/or consisting of steel.

9. The device according to claim 1, wherein the weighing device has a weighing range up to at least 10 kg, and/or wherein the weighing device, depending on the type of gas and gas volume to be added, has a weight resolution corresponding to the pressure, which is equivalent to a resolution of the pressure in the gas storage tank of at least 2 bar.

10. The device according to claim 1, furthermore comprising at least one of a first temperature sensor arranged at the gas buffer storage tank, a second temperature sensor arrangeable at the gas storage tank to be filled, a first pressure sensor fluidically connected to the gas buffer storage tank, and a second pressure sensor connectable to the gas storage tank to be filled and/or connected to a second fluidic connection which is connected to the outlet of the first valve.

11. The device according to claim 10, wherein the first temperature sensor and/or the second temperature sensor are connected to the control unit and/or a display unit, wherein the control unit is configured to only trigger the opening of the first valve for filling the gas storage tank to be filled when a measured temperature value transmitted by the first temperature sensor reaches or drops below a pre-definable first threshold value, wherein the control unit is configured to trigger the closing of the first valve when the measured temperature value transmitted by the first temperature sensor reaches or exceeds a pre-definable second threshold value, and/or wherein the control unit is configured to trigger the closing of the first valve when a measured temperature value transmitted by the second temperature sensor reaches or exceeds a pre-definable third threshold value, wherein the first pressure sensor and/or the second pressure sensor are connected to the control unit and/or the display unit, wherein the control unit is configured to only trigger the opening of the first valve for filling the gas storage tank to be filled when a measured pressure value transmitted by the first pressure sensor reaches or exceeds a pre-definable threshold value, and/or wherein the control unit is configured to trigger the closing of the first valve when a measured pressure value transmitted by the second pressure sensor reaches or exceeds a pre-definable further threshold value.

12. The device according to claim 1, wherein the device is a safety testing device.

13. The device according to claim 12, wherein the outlet of the first valve is fluidically connected to a valve to be tested or a gas storage tank to be tested.

14. A device for filling gas storage tanks, comprising:
a frame and/or a housing;
a gas buffer storage tank for a gas, the gas buffer storage tank being rotatably arranged with respect to the frame and/or with respect to the housing;
a first valve, comprising an inlet connected to the gas buffer storage tank, and an outlet for connection to a gas storage tank to be filled; and
a weighing device connected to the gas buffer storage tank for weighing the gas buffer storage tank, wherein the inlet of the first valve is fluidically connected to the gas buffer storage tank, and/or wherein the gas buffer storage tank and the inlet of the first valve are connected to one another via a flexible first fluidic connection and/or at least one second valve.

15. The device according to claim 14, wherein the flexible first fluidic connection comprises a hose or a spiral tube, and/or wherein the first valve and/or the at least one second valve are controllable or even close-loop controllable.

16. The device according to claim 15, furthermore comprising a control unit which is connected to the first valve, the at least one second valve and/or the weighing device, and configured to trigger an opening and/or a closing of the respective valve and/or to receive measured values from the weighing device.

17. The device according to claim 16, wherein the control unit is configured to trigger the closing of the first valve when the measured values reach or drop below a pre-definable threshold and/or reach or exceed a predeterminable difference from an initial measured value before the opening of the first valve.

18. A device for filling gas storage tanks, comprising:
a frame and/or a housing;
a gas buffer storage tank for a gas, the gas buffer storage tank being rotatably arranged with respect to the frame and/or with respect to the housing;
a first valve, comprising an inlet connected to the gas buffer storage tank, and an outlet for connection to a gas storage tank to be filled; and
a weighing device connected to the gas buffer storage tank for weighing the gas buffer storage tank, wherein the gas buffer storage tank has an internal volume, the capacity of which is typically gauged by liters of water, of at least 10 L, wherein the gas buffer storage tank, the flexible first fluidic connection and/or the second fluidic connection have a pressure resistance of at least 200 bar, and/or wherein the gas storage tank is a gas pressure vessel.

19. The device according to claim 18, wherein the capacity of the gas buffer storage tank is at least 200 L and/or wherein the pressure resistance is at least 700 bar.

20. The device according to claim 18, wherein the capacity of the gas buffer storage tank is at least 500 L and/or wherein the pressure resistance is at least 1000 bar.

* * * * *